(12) United States Patent
Sugawara et al.

(10) Patent No.: US 7,000,721 B2
(45) Date of Patent: Feb. 21, 2006

(54) OPTICAL OBJECT DETECTION APPARATUS DESIGNED TO MONITOR FRONT AND LATERAL ZONES OF VEHICLE

(75) Inventors: Ryoichi Sugawara, Nagoya (JP); Takeshi Matsui, Toyohashi (JP)

(73) Assignee: Denso Corporation, Kariya (JP)

( * ) Notice: Subject to any disclaimer, the term of this patent is extended or adjusted under 35 U.S.C. 154(b) by 296 days.

(21) Appl. No.: 10/132,565

(22) Filed: Apr. 26, 2002

(65) Prior Publication Data

US 2002/0157887 A1 Oct. 31, 2002

(30) Foreign Application Priority Data

Apr. 27, 2001 (JP) ............................. 2001-132116

(51) Int. Cl.
*B62D 1/00* (2006.01)
(52) U.S. Cl. ...................................... 180/169; 180/274
(58) Field of Classification Search ................ 180/167, 180/168, 169, 271, 274; 342/54, 70; 256/4.01, 256/5.01, 5.15, 141.1
See application file for complete search history.

(56) References Cited

U.S. PATENT DOCUMENTS

| | | | |
|---|---|---|---|
| 3,862,415 A * | 1/1975 | Harnden et al. ............ 250/221 |
| 4,891,624 A * | 1/1990 | Ishikawa et al. ............ 340/436 |
| 5,011,288 A * | 4/1991 | Noji et al. .................. 356/622 |
| 5,463,384 A | 10/1995 | Juds | |
| 5,631,639 A * | 5/1997 | Hibino et al. ............... 340/903 |
| 5,751,211 A * | 5/1998 | Shirai et al. ................ 340/435 |
| 5,760,886 A | 6/1998 | Miyazaki et al. | |
| 5,995,883 A * | 11/1999 | Nishikado ................... 701/23 |
| 6,122,040 A * | 9/2000 | Arita et al. ................ 356/4.01 |
| 6,265,968 B1 * | 7/2001 | Betzitza et al. ............. 340/436 |
| 6,301,003 B1 * | 10/2001 | Shirai et al. ............. 356/4.01 |
| 6,400,448 B1 * | 6/2002 | Sugawara et al. ......... 356/5.01 |
| 6,466,863 B1 * | 10/2002 | Shirai et al. ............... 701/200 |
| 6,553,283 B1 * | 4/2003 | Shirai et al. ................... 701/1 |
| 6,580,385 B1 * | 6/2003 | Winner et al. ................ 342/70 |

FOREIGN PATENT DOCUMENTS

| | | | | |
|---|---|---|---|---|
| DE | WO 89/04498 | * | 5/1989 | ................ 180/169 |
| JP | 57-197486 | | 12/1982 | |
| JP | 362214408 A | * | 9/1987 | |
| JP | 362214409 A | * | 12/1989 | |
| JP | 401316809 A | * | 12/1989 | |
| JP | 402109105 A | * | 4/1990 | |
| JP | 402227707 A | * | 9/1990 | |
| JP | 3-505644 | | 12/1991 | |
| JP | 403286310 A | * | 12/1991 | |
| JP | 4-99018 | | 8/1992 | |
| JP | 7-98381 | | 4/1995 | |

\* cited by examiner

*Primary Examiner*—Christopher P. Ellis
*Assistant Examiner*—Bridget Avery
(74) *Attorney, Agent, or Firm*—Posz Law Group, PLC

(57) ABSTRACT

An optical detection device for vehicles such as a laser radar is provided. The device consists of frontal and lateral object detection optical systems to monitor a font and a lateral zone around the vehicle, respectively. The frontal and lateral object detection optical systems share several component parts and a signal processing circuit installed in a device body, thereby resulting in a simplified structure of the device and allowing the size of the device to be decreased.

32 Claims, 12 Drawing Sheets

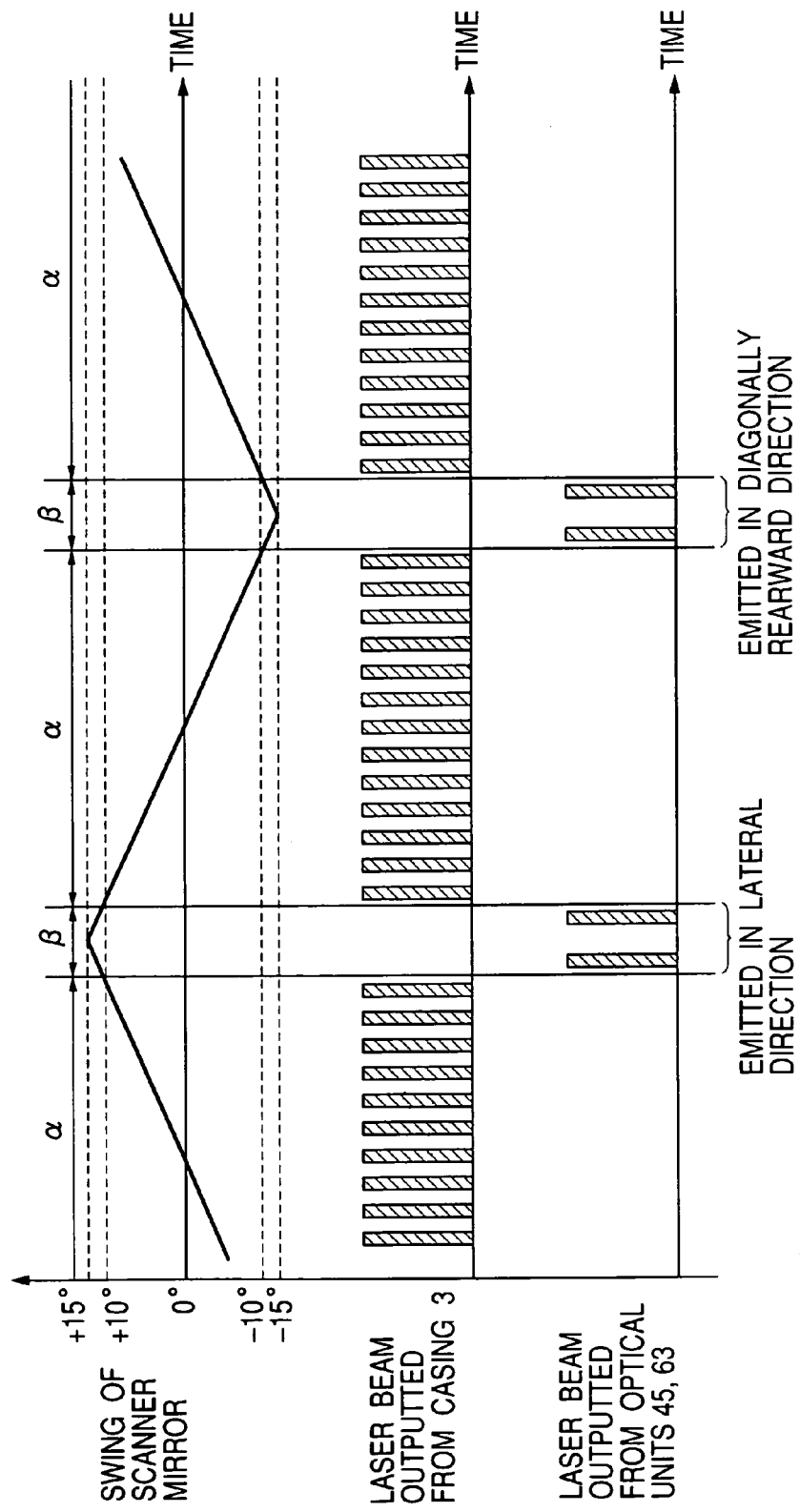

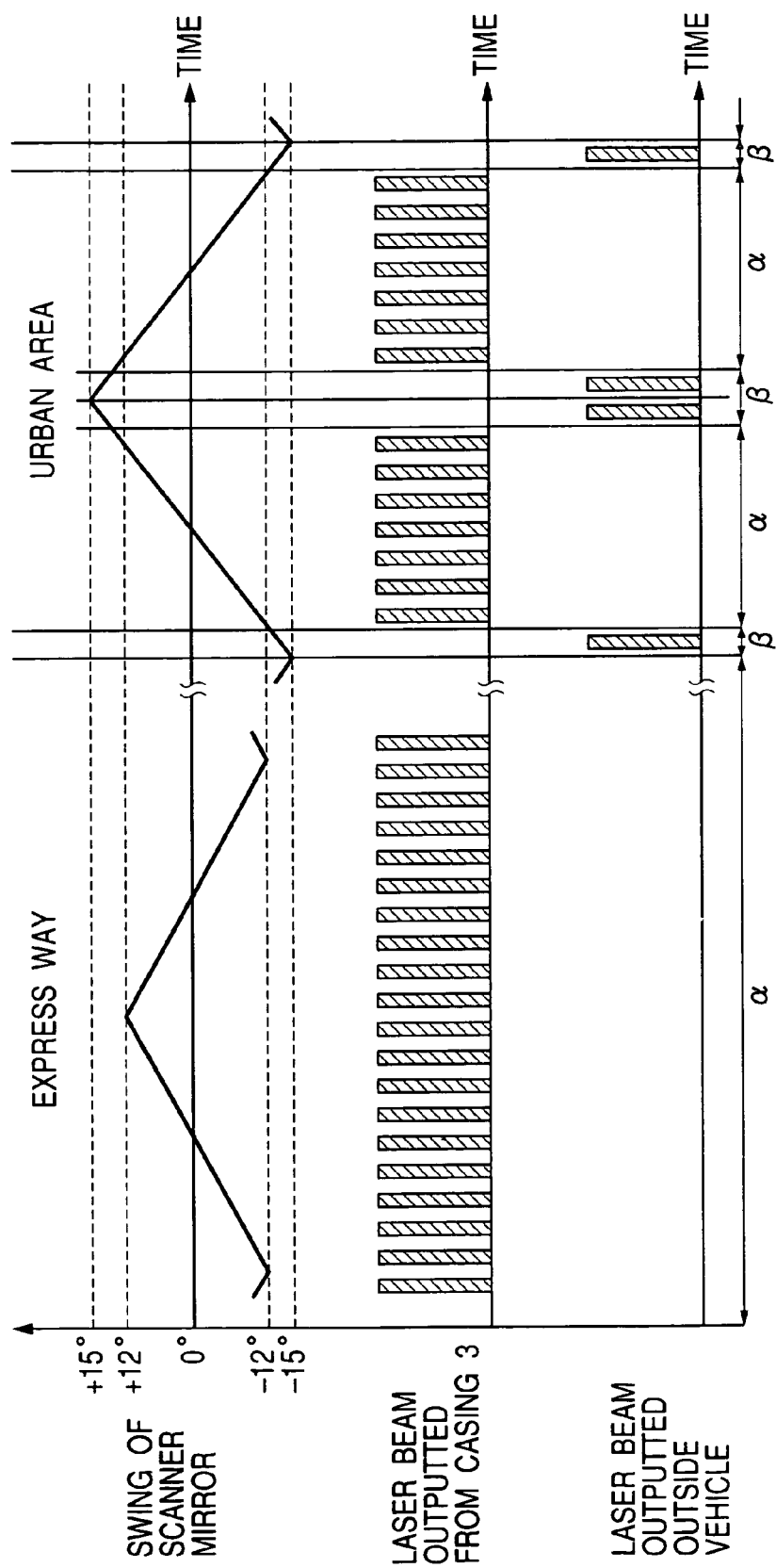

OPTICAL OBJECT DETECTION APPARATUS DESIGNED TO MONITOR FRONT AND LATERAL ZONES OF VEHICLE

BACKGROUND OF THE INVENTION

1 Technical Field of the Invention

The present invention relates generally to a simple structure of an optical object detection apparatus for vehicles such as a laser radar which is designed to monitor a front and a lateral zone around the vehicle.

2 Background Art

Japanese Patent First Publication No. 7-98381 discloses a laser radar designed to measure the distance to an object such as a vehicle traveling ahead of a system vehicle equipped with the laser radar. U.S. Pat. No. 5,463,384 teaches an object detection device designed to monitor a lateral area of a vehicle.

The former system uses a semiconductor laser and consists of a pulsed light emitting circuit, a laser outputting optical system, a laser receiving optical system, a pulsed light sensitive circuit, a timer circuit, and a signal processing circuit. The timer circuit determines the amount of time required by a pulsed light outputted by the pulsed light emitting circuit through the laser outputting optical system to travel to and return from an object. The signal processing circuit works to determine the distance to the object using the amount of time calculated by the timer circuit.

The latter system uses a photocoupler made up of an LED and a photodiode or a photointerruptor and consists, like the former system, of a light emitting circuit, a light emitting optical system, a light receiving optical system, and a light sensitive circuit. The system works to sense reception of a return of a light signal from an object such as a vehicle to detect the presence of the object.

The above systems have the following problems and still left room for improvement.

Specifically, monitoring a plurality of different areas around the vehicle requires mounting a plurality of separate optical systems on different portions of a body of the vehicle, which results in undesirable increases in consumption of electrical power and manufacturing cost. An additional problem is also encountered in that portions of the body of the vehicle on which the optical systems are allowed to be mounted are limited depending upon the size of the optical systems. Further, a bulky structure of the optical systems mar the appearance of the vehicle.

SUMMARY OF THE INVENTION

It is therefore a principal object of the invention to avoid the disadvantages of the prior art.

It is another object of the invention to provide a simplified structure of an object detection apparatus for automotive vehicles which is designed to monitor a plurality of different areas around the vehicle.

According to one aspect of the invention, there is provided an optical object detection apparatus for a vehicle which may be used in measuring a distance to an object present around the vehicle and/or detecting the presence of the object. The optical object detection apparatus comprises: (a) an apparatus body installed in the vehicle, the apparatus body having disposed therein an optical device working to produce a light wave and process a return of the light wave from an object present around the vehicle to produce a signal indicative thereof; (b) an optical mechanism installed within the apparatus body, the optical mechanism working to direct the light wave to a first object detectable zone defined ahead of the vehicle; and (c) an optical unit installed in the vehicle in optical connection with the apparatus body. The optical unit works to direct the light wave transmitted from the apparatus body to a second object detectable zone defined around the vehicle other than the first object detectable zone and to transmit a return of the light wave from an object present within the second object detectable zone to the optical device in the apparatus body.

In the preferred mode of the invention, the optical device installed in the apparatus body processes the return of the light wave from the first object detectable zone in a given first operation time to produce the signal indicative of detection of the object and also process the return of the light wave from the second object detectable zone in a given second operation time following the first operation time to produce the signal indicative of detection of the object.

The optical mechanism works as a scanner to sweep the light wave across a given scanning angle. When the optical mechanism is sweeping the light wave in a first angular range defined across a central portion of the scanning angle, the light wave is directed to the first object detectable zone. When the optical mechanism is sweeping the light wave in a second angular range defined outside the first angular range within the scanning angle, the light wave is directed to the second object detectable zone.

The optical mechanism includes a scanner mirror which swings over the given scanning angle. An angle of swing of the scanner mirror is controlled to switch between a first scan mode in which the light wave is directed to the first object detectable zone and a second scan mode in which the light wave is directed to the second object detectable zone.

The angle of swing of the scanner mirror may be controlled as a function of the speed of the vehicle.

The second operation time in which the optical device processes process the return of the light wave from the second object detectable zone may be decreased as the speed of the vehicle increases.

The optical object detection apparatus may further comprises a second optical unit which is installed in the vehicle in optical connection with the apparatus body and works to direct the light wave produced in the apparatus body to a third object detectable zone defined around the vehicle other than the first and second object detectable zones and to transmit a return of the light wave from an object within the third object detectable zone to the optical device in the apparatus body. The number of the optical units operable may be decreased as the speed of the vehicle increases.

The optical device includes a light wave emitting circuit emitting the light wave, a light wave sensitive circuit sensitive to the return of the light wave to produce the signal, and a light wave processing circuit process the signal from the light wave sensitive circuit to detect the object. The optical unit includes a light emitting optical system and a light receiving optical system which are connected to the light wave emitting circuit, the light wave sensitive circuit, and the light wave processing circuit.

The optical unit is coupled with the optical device of the apparatus body through an optical connector unit. The optical connector unit includes a portion of a casing of the optical body.

The optical connector unit may include an optical member extending through a casing of the apparatus body.

The casing of the apparatus body may have a light wave transmissible wall. The optical connector unit may alternatively include an optical member joined to the light wave transmissible wall.

The optical unit may be installed in one of a blinker, a reflector, a tail lamp, and a sideview mirror.

BRIEF DESPCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIG. 9 is a time chart which shows a frontal object detection mode and a lateral object detection mode performed cyclically in a laser radar;

FIG. 12 is a time chart which shows a frontal object detection mode and a lateral object detection mode performed cyclically in a laser radar according to the second embodiment of the invention;

Figure 14A:
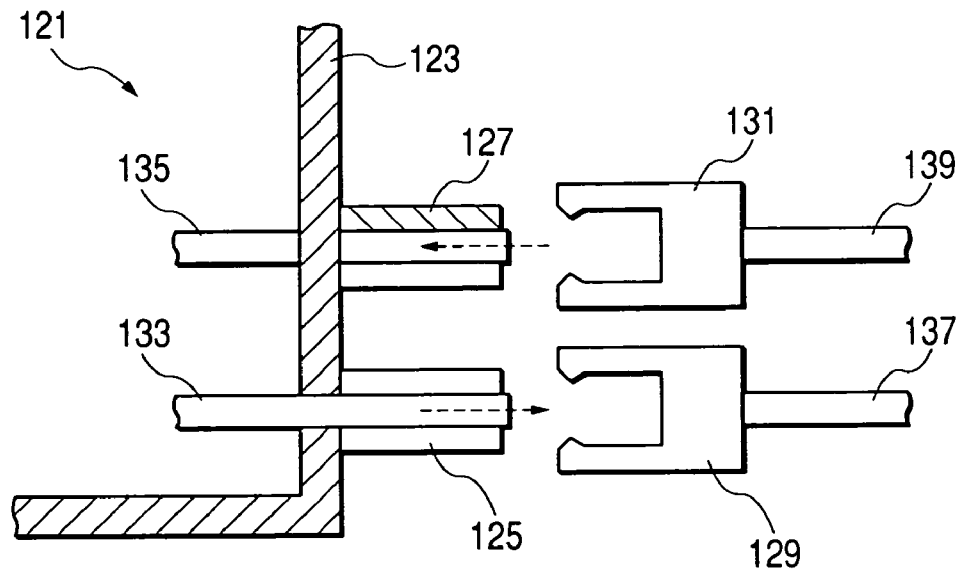
Figure 14B:
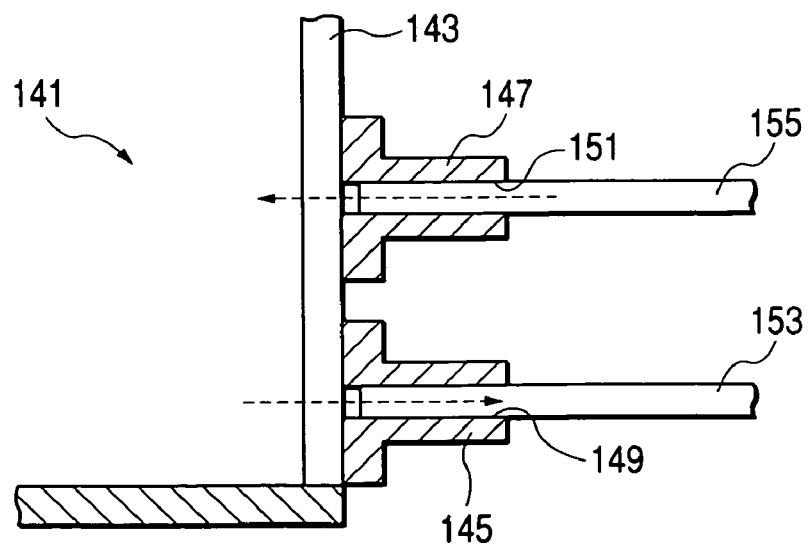

FIG. 14(a) is a partially sectional view which shows connection of a device body of a laser radar to a lateral object detection optical unit in a laser radar according to the fourth embodiment of the invention; and FIG. 14(b) is a partially sectional view which shows connection of a device body of a laser radar to a lateral object detection optical unit in a laser radar according to the fifth embodiment of the invention.

DESCRIPTION OF THE PREFERRED EMBODIMENTS

Figure 1:
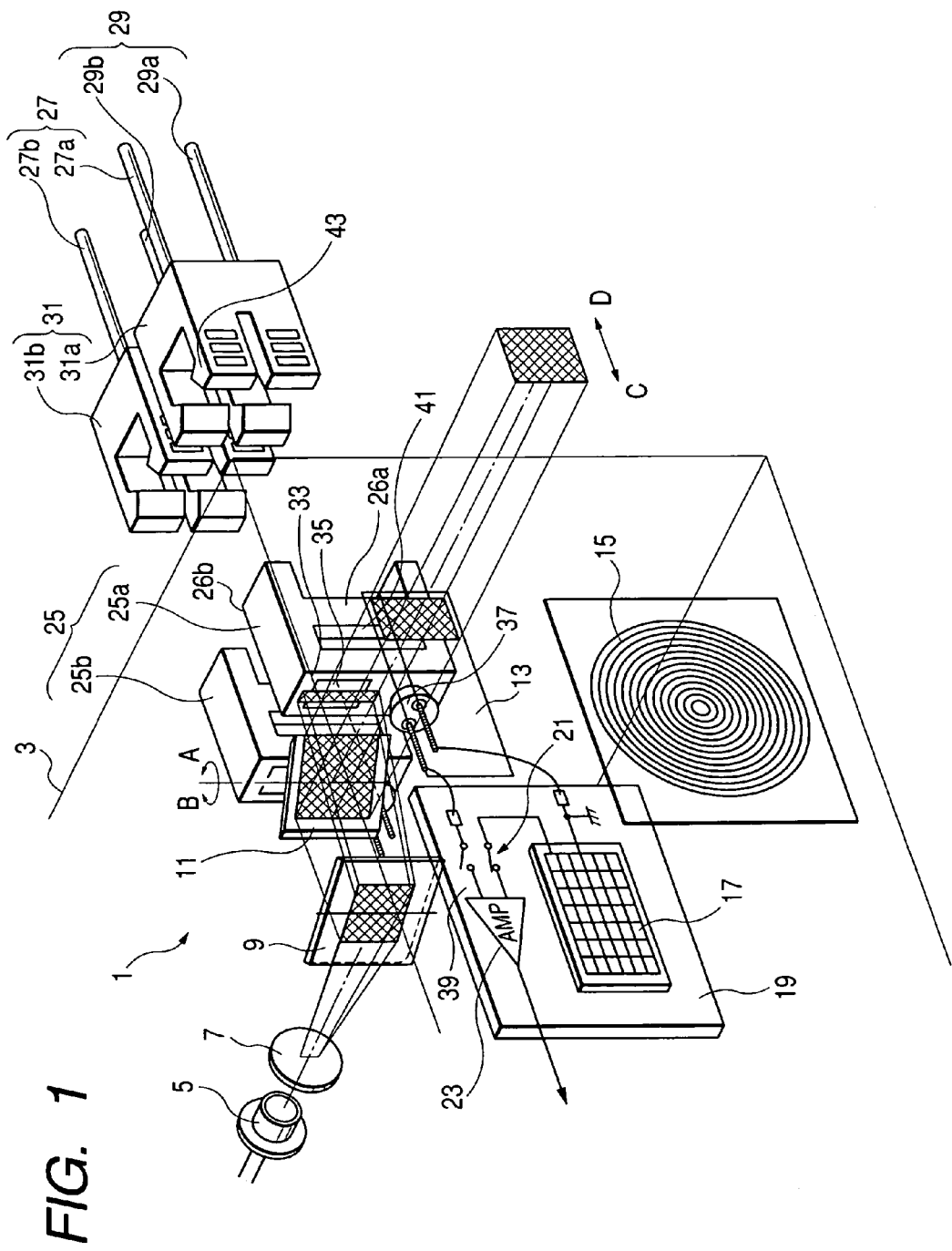
FIG. 1 is a perspective view which shows a major part of a laser radar according to the first embodiment of the invention.

Referring to the drawings, wherein like reference numbers refer to like parts in several views, particularly to FIG. 1, there is shown an object detection device according to the first embodiment of the invention which is installed in an automotive vehicle and designed to measure distances to an obstacle or object present in a lateral direction of the vehicle as well as an object present ahead of the vehicle. In the following discussion, the term "object detection" means detection of the presence of an object and/or measurement of the distance to the object.

The object detection device of the invention is implemented by a laser radar 1 which, as discussed later in detail, consists essentially of a frontal object detection optical system and a lateral object detection optical system. One of features of the invention is that the frontal and lateral object detection optical systems share several component parts and a signal processing circuit installed in a device body, thereby resulting in a simplified structure of the laser radar 1.

1 Frontal Object Detection Optical System

The laser radar 1, as clearly shown in FIG. 1, has installed within a device body or casing 3 a light-emitting system consisting of a laser diode 5, a light outputting lens 7, a stationary mirror 9, a swingable mirror 11 (will be referred to as a scanner mirror below), and a projection window 13. The laser diode 5 emits a laser light in the form of a pulse. The light-outputting lens 7 converges and shapes the laser light outputted from the laser diode 5 to produce a laser beam of a predetermined shape. The stationary mirror 9 reflects thereon and directs the laser beam to the scanner mirror 11. The scanner mirror 11 projects the laser beam through the projection window 13 ahead of the vehicle.

The scanner mirror 11 is, as described later in detail, controlled to swing about a vertical axis in directions, as indicated by arrows A and B to sweep the laser beam over a front detectable zone in scanning directions, as indicated by arrows C and D.

The laser radar 1 also includes a light-receiving optical system consisting of a light-receiving lens 15 and a photodiode 17. The light-receiving lens 15 receives a return of the laser beam from an object present in the front detectable zone and directs it to the photodiode 17. The photodiode 17 is sensitive to the laser beam incident thereon to produce a voltage signal as a function of the intensity of the laser beam. The photodiode 17 is fabricated on a circuit board or substrate 19 and connected at one of output terminals thereof to an amplifier 23 through a first switch 21 made of a transistor and at the other terminal to ground.

2 Laterial Object Detection Optical System

In order to detect or monitor an object existing in a lateral detectable zone defined on a side of the vehicle, the laser radar 1 has installed on a side wall of the casing 3 an internal connector unit 25 which is coupled with an external connector unit 31 to which a pair of optical fibers 27a and 27b and a pair of optical fibers 28a and 28b are connected. The internal connector unit 25 and the external connector unit 31 are, in practice, connected to each other, but illustrated as being separate for ease of visibility.

The internal connector unit 25 consists of a pair of connectors 25a and 25b. Each of the connectors 25a and 25b has a box-like body which has an opening oriented to the external connector unit 31 and a bottom 33 mounted on the side wall of the casing 3. The bottom 33 has a rectangular input opening 35 formed in an upper portion thereof, as viewed in the drawing, through which a laser beam passes. The scanner mirror 11 is, as described later in detail, designed to sweep a laser beam through a given scanning angle to switch between a narrower range scanning mode and a wider range scanning mode cyclically. The narrower range scanning mode is entered when the scanner mirror 11 swings laterally across a narrower angular range defined over a central portion (i.e., across a longitudinal center line of the vehicle) of the scanning angle, thereby emitting the laser beam to the front detectable zone. The wider range scanning mode is entered when the angle of swing of the scanner mirror 11 exceeds the narrower angular range and falls in a wider angular range defined outside the narrower angular range, so that a reflecting surface of the scanner mirror 11 is oriented out of the front detectable zone, thereby directing the laser beam to the input opening 35 of the connector 25a for monitoring the lateral detectable zone.

Each of the connectors 25a and 25b has installed in the bottom 33 a photodiode 37 which is sensitive to light and outputs a voltage signal. The photodiode 37 is connected at an output terminal to the amplifier 23 through a second switch 39 made of a transistor and at the other terminal to ground.

Figure 2:
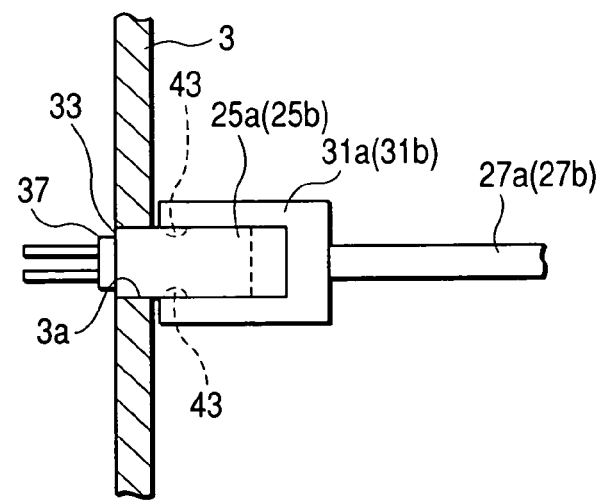
FIG. 2 is a partially sectional view which shows a connection of a device body of a laser radar to a lateral object detection optical unit.

Each of the connectors 25a and 25b has formed in opposed side walls 26a and 26b rectangular openings 41 in which barb-like protrusions 43 formed on a corresponding one of connectors 31a and 31b of the external connector unit 31 are, as clearly shown in FIG. 2, fitted to establish a firm connection therebetween.

Each of the connectors 25a and 25b is fitted in an opening 3a, as shown in FIG. 2, formed in the side wall of the casing 3 and glued.

Figure 3:
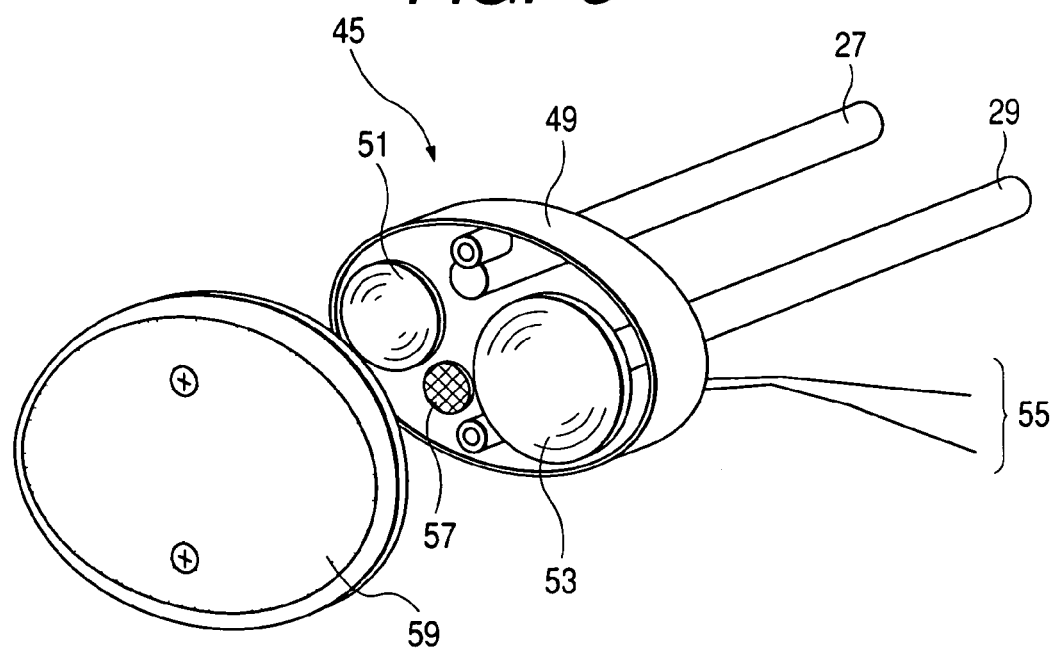
FIG. 3 is a perspective view which shows a lateral object detection optical unit.

The optical fibers 27a and 29a are each connected at one end thereof to the connector 31a of the external connector unit 31 and at the other end, as clearly shown in FIG. 3, to a lateral object detection optical unit 45 for measuring the distance to an object present on a side of the vehicle.

Figure 4:
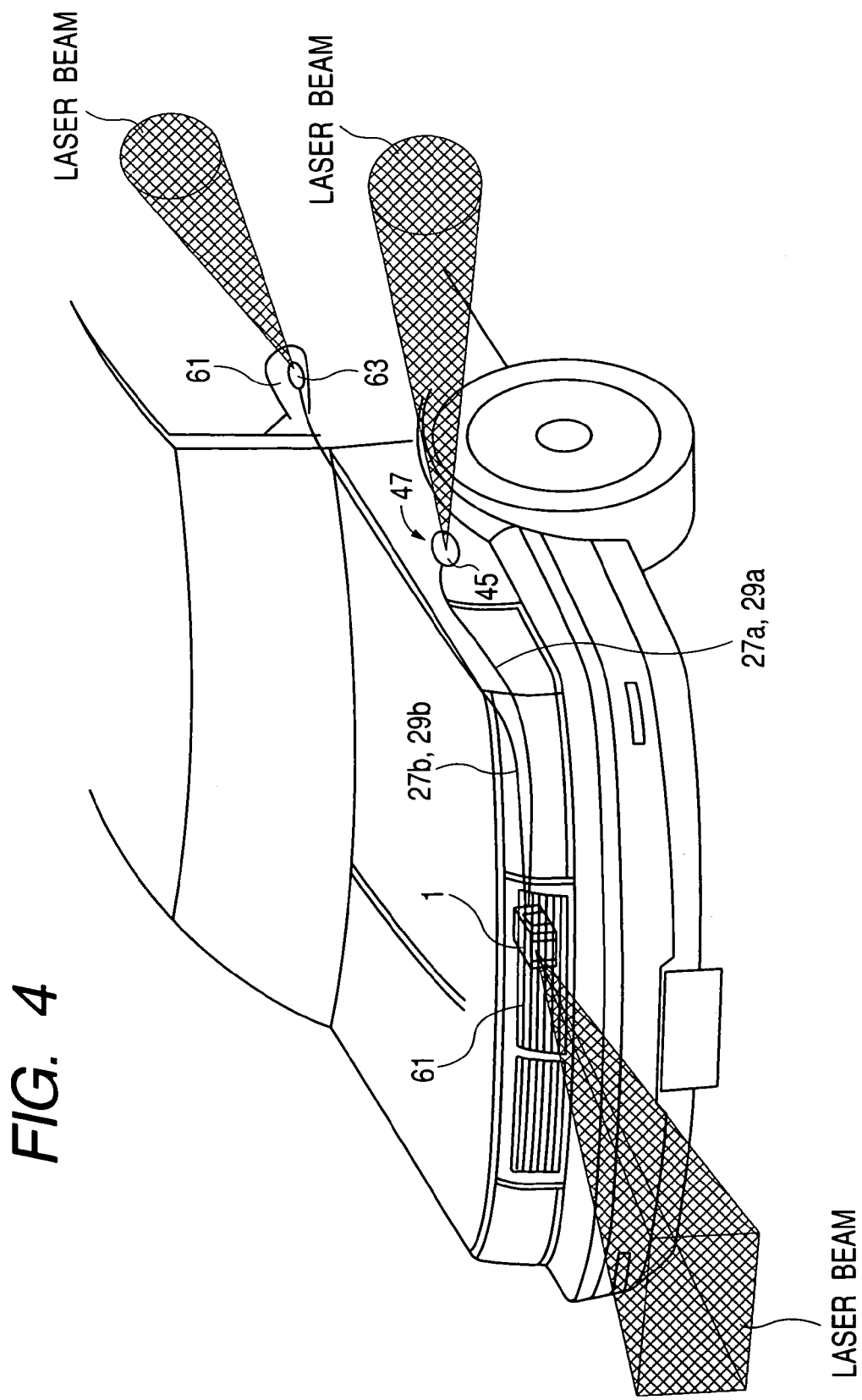
FIG. 4 is a perspective view which shows portions of a body of a vehicle on which a device body and lateral object detection units of a laser radar are mounted.

The lateral object detection optical unit 45 is, as clearly shown in FIG. 4, installed within a blinker or turn indicator 47 mounted in a side wall of a vehicle body. Referring back to FIG. 3, the lateral object detection optical unit 45 consists of a projection lens 51 facing an end of the optical fiber 27a, a light-receiving lens 53 facing an end of the optical fiber 29a, and an indicator lamp 57 connected to electric wires 55 which are installed in an oval casing 49 and hermetically sealed by a transparent cover 59.

The laser radar 1 is, as clearly shown in FIG. 4, installed within an engine compartment 61 and coupled optically with the lateral object detection optical unit 45 through the optical fibers 27a and 29a. In operation, the laser radar 1 emits a laser beam ahead of the vehicle to measure the distance to an object within the front detectable zone and also emit a laser beam through the lateral object detection optical unit 45 laterally of the vehicle to measure the distance to an object within the lateral detectable zone.

The laser radar 1 is, as clearly shown in FIG. 4, also coupled to a lateral object detection optical unit 63 through the optical fibers 27b and 29b joined to the connector 30b of the external connector unit 31. The lateral object detection optical unit 63 is substantially identical in structure with the lateral object detection optical unit 45 and installed in a sideview mirror 61 to monitor a diagonally rearward range defined within the lateral detectable zone.

3 Electrical Structure

Figure 5:
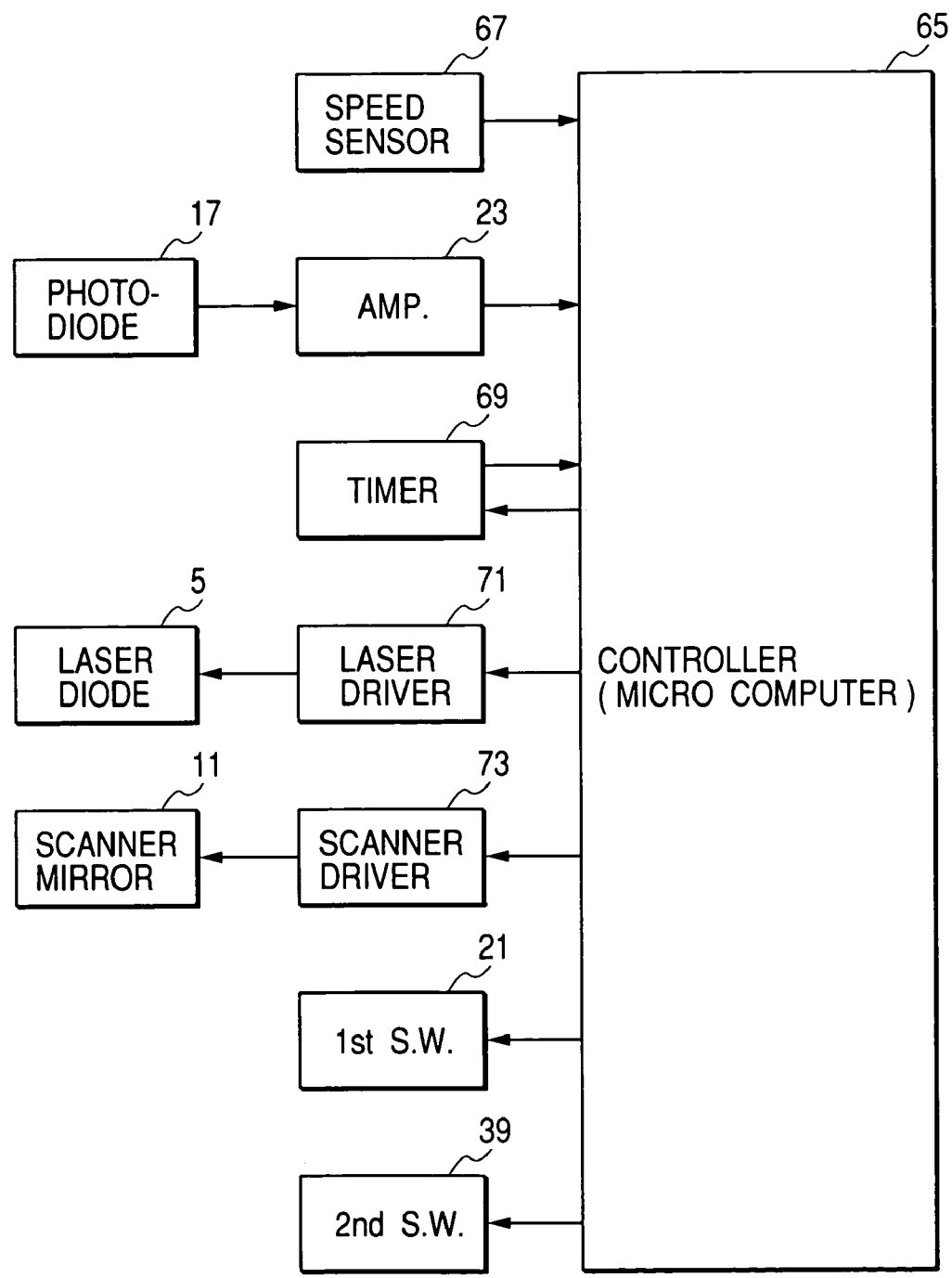
FIG. 5 is a block diagram which shows a circuit structure of a laser radar.

The laser radar 1, as shown in FIG. 5, includes a controller 65 implemented by a microcomputer consisting of a CPU, a ROM, a RAM, and an I/O device. The controller 65 is connected to a vehicle speed sensor 67, the amplifier 23, a time counting circuit 69, a laser driver 71, a scanner driver 73, the first switch 21, and the second switch 39. The vehicle speed sensor 67 can be of any know arrangements and work to measure the speed of a vehicle equipped with the laser radar 1 (will also be referred to as a system vehicle below) and output a signal indicative thereof to the controller 65. The time counting circuit 69 determines the amount of time required by a laser beam emitted from the laser diode 5 to travel to and return from an object. The laser driver 71 works to energize the laser diode 71. The scanner driver 73 works to swing the scanner mirror 11 magnetically.

A two-mode object detection operation of the laser radar 1 will be described below.

Figure 6:
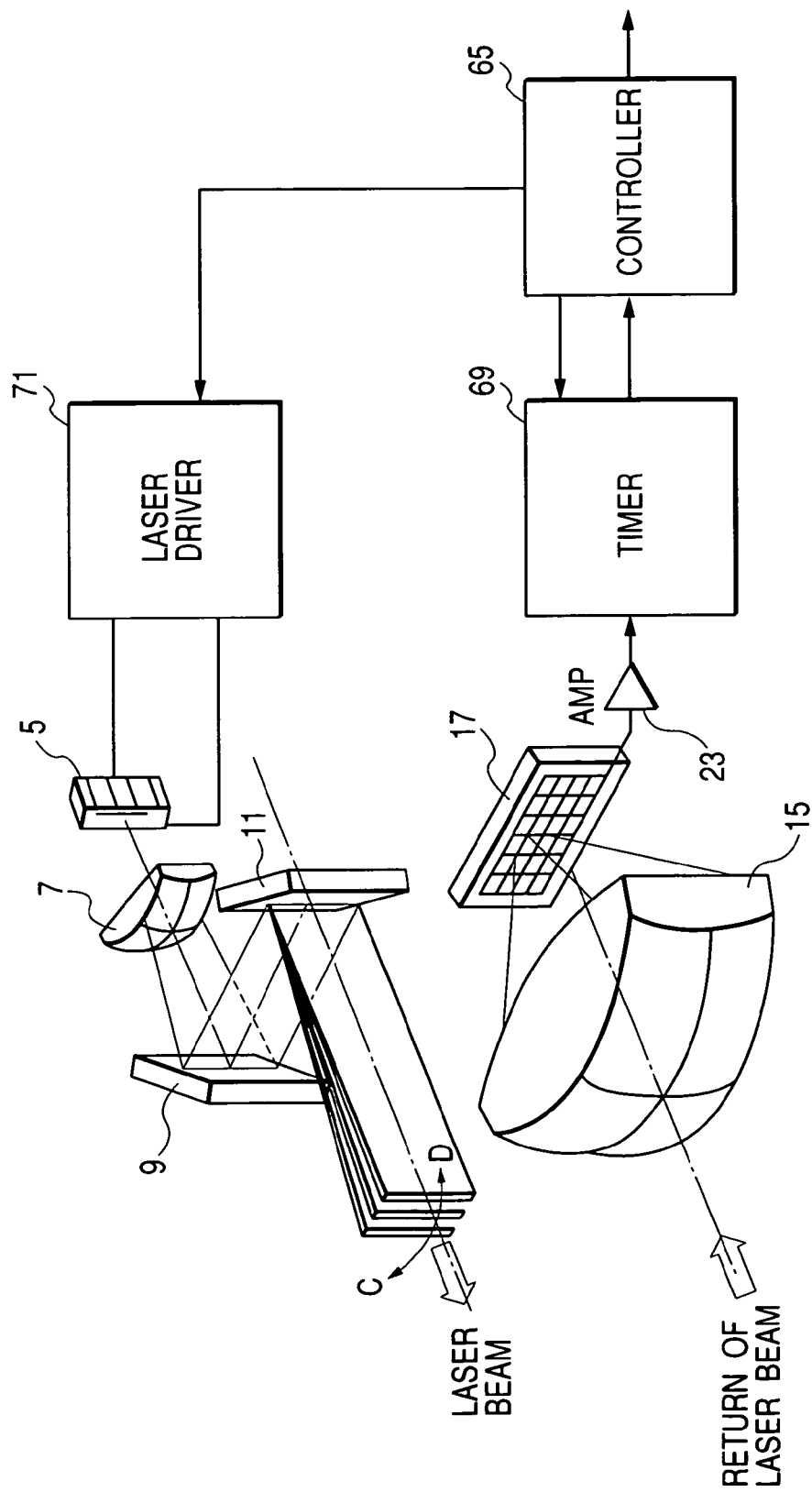
FIG. 6 shows an internal structure of a device body of a laser radar.
Figure 7:
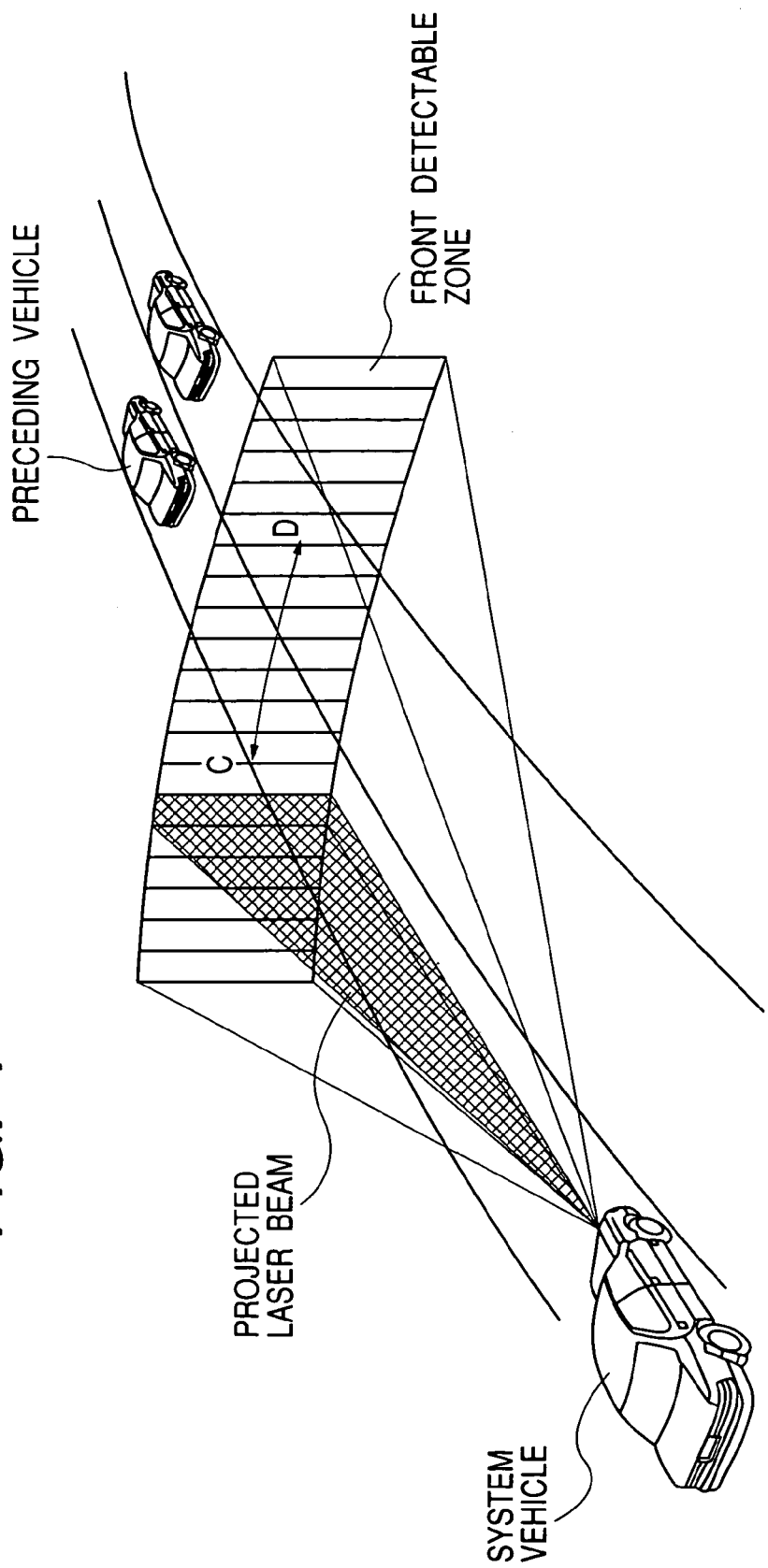
FIG. 7 is a perspective view which shows a front detectable zone which is defined ahead of a vehicle and swept by a laser radar.

The controller 65 first enters a frontal object detection mode (i.e., the narrower angle scanning mode as described above) in order to measure the distance to an object present in the front detectable zone. The controller 65 outputs, as shown in FIG. 6, a control signal to the diode driver 71 to energize the laser diode 5. The laser diode 5 emits a laser light in the form of a pulse. The laser light is converted by the light-outputting lens 7 into a laser beam of a given shape and outputted to the stationary mirror 9. The stationary mirror 9 reflects thereon toward the laser beam to the scanner mirror 11. The scanner mirror 11 swings in the lateral directions C and D, as shown in FIG. 1, and outputs the laser beam ahead of the vehicle, thereby scanning, as clearly shown in FIG. 7, the front detectable zone to detect an object such as a preceding vehicle traveling ahead of the system vehicle.

In this embodiment, a laser beam emitted from the laser diode 5 is shaped by the light-outputting lens 7 into a strip-like one which has a vertical angle of 2° and a lateral angle of 0.20°. The front detectable zone is defined by a rectangular area ranging in a width-wise direction of the system vehicle over ±10° across a longitudinal center line of the system vehicle. The reflecting surface of the scanner mirror 11 has preferably the smallest possible area which has the laser beam fall only within the front detectable zone when the scanner mirror 11 is swinging within a range of ±10°.

The photodiode 17 is made up of a plurality of light-sensitive elements. The light-sensitive elements may be divided into an upper and a lower section which are switched in operation by the controller 65 to scan a frontal area two-dimensionally.

Referring back to FIG. 6, a return of the laser beam from the object within the front detectable zone is collected by the light-receiving lens 15 and directed onto the photodiode 17.

When the laser radar 1 is in the frontal object detection mode, the first switch 21 is turned on to connect the photodiode 17 to the amplifier 23, while the second switch 39 is turned off. The laser beam incident on the photodiode 17 is, thus, converted into an electrical signal and inputted to the time counting circuit 69 through the amplifier 23.

The time counting circuit 69 determines the length of time required by the laser beam to travel to and return from the object and outputs a signal indicative thereof to the controller 65. The controller 65 calculates the distance to the object using the length of time determined by the time counting circuit 69. The controller 65 may monitor incidence of light on the photodiode 17 to detect the presence of an object within the front detectable zone. The controller 65 sends information about the presence of and/or distance to the object to a traveling control system such as an automatic cruise control system (not shown).

Following the frontal object detection mode, the controller 65 enters to a lateral object detection mode (i.e., the wider angle scanning mode as described above) and turns on the second switch 39 and off the first switch 21.

For instance, when the scanner mirror 11 turns in the direction A, as shown in FIG. 1, and the angle of swing of the scanner mirror 11 exceeds the narrower angular range of ±10° and falls in a range of ±5° lying out of the narrower angular range, a laser beam reflected from the stationary mirror 9 travels directly to the input opening 35 formed in the bottom 33 of the connector 25a of the connector unit 25 and is transmitted through the optical fiber 27a to the lateral object detection optical unit 45 installed in the turn indicator 47 of the system vehicle. The laser beam is then emitted from the projection lens 51 to the lateral detectable zone.

When the scanner mirror 11 reverses in the direction B and falls in a range of −5° lying out of the narrower angular range, a laser beam reflected from the stationary mirror 9 travels directly to the input opening 35 of the connector 25b and is transmitted through the optical fiber 27b to the lateral object detection optical unit 61 installed in the sideview mirror 61 of the system vehicle. The laser beam is then emitted to the diagonally rearward range of the lateral detectable zone.

If an object is in a side range of the lateral detectable zone defined just beside the system vehicle, a return of the laser beam from the object enters the light-receiving lens 53 of the lateral object detection optical unit 45 and travels to the photodiode 37 through the optical fiber 29a, and the connectors 31a and 25a. The photodiode 37 outputs an electrical signal to the time counting circuit 69 through the second switch 39 and the amplifier 23. The time counting circuit 69, like the above, determines the length of time required by the laser beam to travel to and return from the object. The controller 65 calculates the distance to the object using the length of time determined by the time counting circuit 69. The controller 65 may alternatively monitor incidence of light on the photodiode 37 to detect only the presence of an object present within the lateral detectable zone.

If an object is in the diagonally rearward range of the lateral detectable zone, a return of the laser beam from the object is received by the lateral object detection optical unit 63. The distance to the object is determined in the same manner as described above, and explanation thereof in detail will be omitted here.

As apparent from the above discussion, the laser radar 1 of this embodiment is designed to detect an object cyclically in the frontal object detection mode and the lateral object detection mode. When the scanner mirror 11 is swinging, as can be seen from FIGS. 8 and 9, across the narrower angular range of ±10°, the laser radar 1 enters the frontal object detection mode and emits a laser beam through the projection window 13 of the casing 3, thereby scanning the laser beam only across the front detectable zone defined ahead of the system vehicle. When the angel of swing of the scanner mirror 11 exceeds the narrower angular range and falls in the wider angular range of ±5° in excess of ±10°, the scanner mirror 11 transmits laser beams alternately to the lateral object detection optical units 45 and 63, thereby monitoring, as clearly shown in FIG. 9, the side range of the lateral detectable zone defined just beside the system vehicle and the diagonally rearward range of the lateral detectable zone defined diagonally rearward of the system vehicle cyclically.

The laser radar 1 may be employed to measure the distance to a preceding vehicle for controlling the spacing between the system vehicle and the preceding vehicle in a cruise mode of vehicle operation. In this case, the cycle of such a measurement needs to be shortened as the speed of the system vehicle increases. It is, thus, preferable to limit and determine the scanning angle of the scanner mirror 11 for monitoring an object present on the side of the system vehicle depending upon the size of a frontal field of view to be monitored by the laser radar 1.

The laser radar 1 of this embodiment may perform only one of the frontal object detection mode and the lateral object detection mode or either of the frontal object detection mode and the lateral object detection mode in sequence for a preselected period of time as needed.

Figure 10:
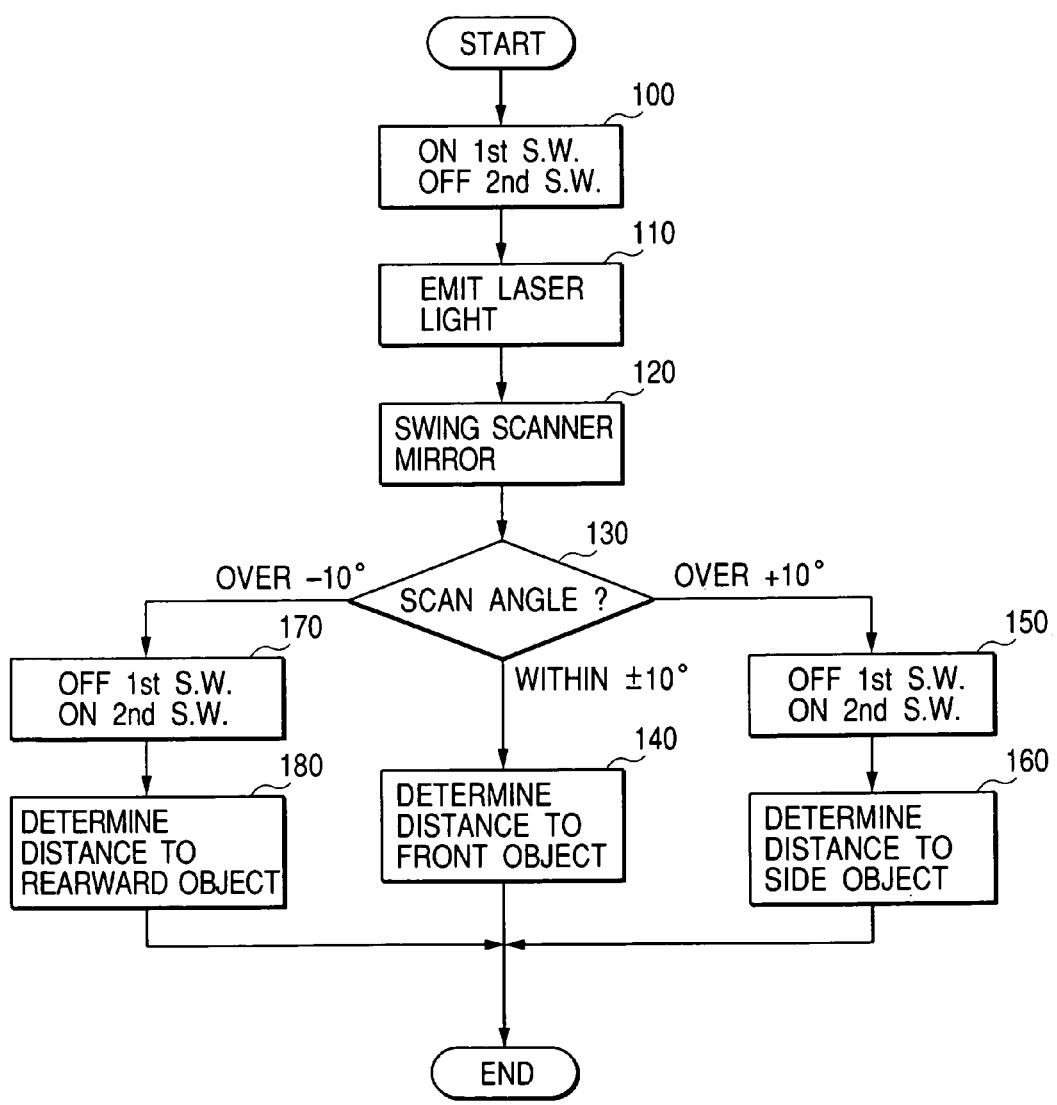
FIG. 10 is a flowchart of a program performed by a laser radar of the first embodiment of the invention.

FIG. 10 shows a sequence of logical steps or program performed by the controller 65 to monitor objects present within the front detectable zone and the lateral detectable zone.

After entering the program, the routine proceeds to step 100 wherein the controller 65 first turns on the first switch 21 and off the second switch 39 in order to measure the distance to an object within the front detectable zone.

The routine proceeds to step 110 wherein the controller 65 actuates the laser driver 71 to energize the laser diode 5.

Figure 8:
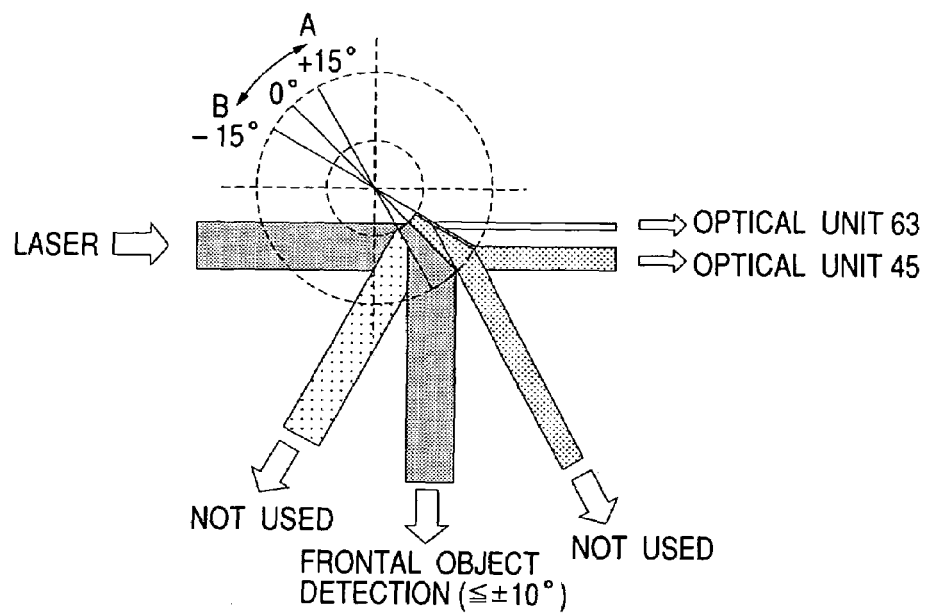
FIG. 8 is an illustration which shows a scanning angle of a reflection surface of a scanner mirror of a laser radar.

The routine proceeds to step 120 wherein the controller 65 actuates the scanner mirror driver 73 to swing, as clearly shown in FIG. 8, the scanner mirror 11 across a scanning angle of ±15°.

The routine proceeds to step 130 wherein it is determined whether an angle of swing of the scanner mirror 11, that is, an angular direction in which the reflection surface of the scanner mirror 11 is oriented lies within ±10° across the longitudinal center line of the vehicle or exceeds ±10° or −10°. In a case where the controller 65 first operates in the frontal object detection mode, the scanner mirror 11 begins a scanning operation within the narrower angular range of ±10°. The routine, thus, proceeds to step 140 wherein the controller 65 determines the distance to an object within the front detectable zone using a return of the laser beam received by the photodiode 17. The routine then terminates.

When the angular direction of the scan mirror 11 exceeds ±10°, the controller 65 enters the lateral object detection mode. After step 130, the routine proceeds to either of steps 150 and 170. When the angular direction of the scanner mirror 11 falls within +5° in excess of +10°, the routine proceeds to step 150 wherein the controller 65 turns off the first switch 21 and on the second switch 39. The routine proceeds to step 160 wherein the controller 65 determines the distance to an object present in the side range of the lateral detectable zone using a return of a laser beam received by the lateral object detection optical unit 45. The routine then terminates.

Alternatively, when the angular direction of the scanner mirror 11 falls within −5° in excess of −10°, the routine proceeds to step 170 wherein the controller 65 turns off the first switch 21 and on the second switch 39. The routine proceeds to step 180 wherein the controller 65 determines the distance to an object present in the diagonally rearward range of the lateral detectable zone using a return of a laser beam received by the lateral object detection optical unit 63. The routine then terminates.

Figure 11:
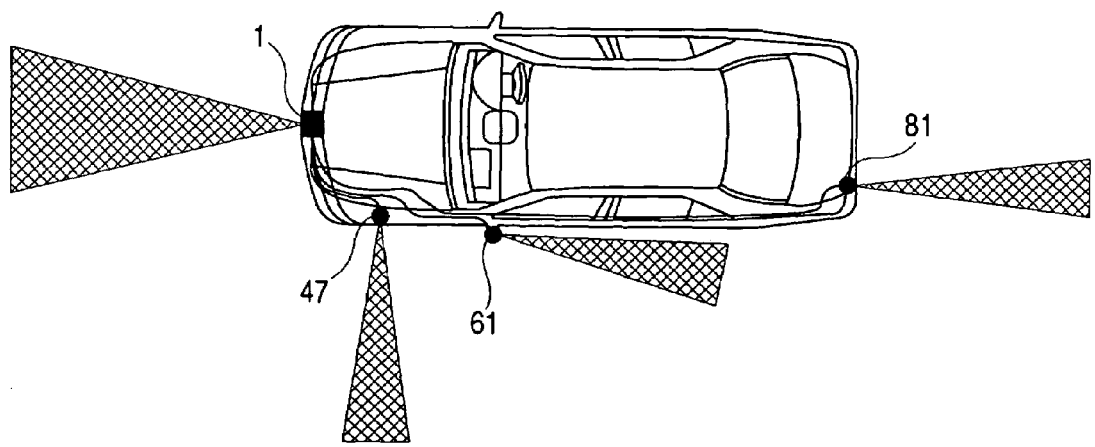
FIG. 11 is a top view which shows portions of a body of a vehicle on which a device body and lateral object detection units of a laser radar are mounted.

As apparent from the above discussion, the structure of the laser radar 1 permits desired discrete angular ranges to be monitored regardless of a mounted location of the laser radar 1 in the system vehicle. For example, an object detection optical unit, like the one in FIG. 3, may further be installed, as illustrated in FIG. 11, in a tail lamp or a rear reflector of the system vehicle to monitor an object present behind the system vehicle.

The controller 65 shares some of the component parts of the laser radar 1 in the frontal object recognition mode and the lateral object detection mode. This results in decreases in manufacturing cost and size of the laser radar 1.

The laser radar 1 according to the second embodiment will be described below which is different from the first embodiment in that the scanning angle of the scanner mirror 11 is changed with a change in speed of the system vehicle. Other arrangements are identical, and explanation thereof in detail will be omitted here.

For instance, when the system vehicle is running on an expressway, and the speed of the system vehicle is relatively high, the possibility of objects posing a risk of approaching the side of the system vehicle may be considered to be low. It is, thus, essential to monitor the front detectable zone to track vehicles traveling ahead of the system vehicle. Alternatively, when the system vehicle is running in an urban area, and the speed of the system vehicle is relatively low, many objects should be considered as approaching the side of the system vehicle. It is, thus, essential to monitor the lateral detectable zone. The laser radar 1 of this embodiment is designed in light of such a situation.

Specifically, the laser radar 1 switches, as can be seen from FIG. 12, the scanning angle of the scanner mirror 11 to ±12° to determine the distance only to an object in front of the system vehicle when the system vehicle is traveling at a higher speed and to ±15° to determine the distance to an object on the side of the system vehicle as well as in front of the vehicle when the system vehicle is traveling at a lower speed.

Specifically, when it becomes essential to monitor objects such as vehicles traveling ahead of the system vehicle, the laser radar 1 of this embodiment increases an operation time of the controller 65 for monitoring the front detectable zone, thereby decreasing a risk of collision with the objects in front of the system vehicle.

Figure 13:
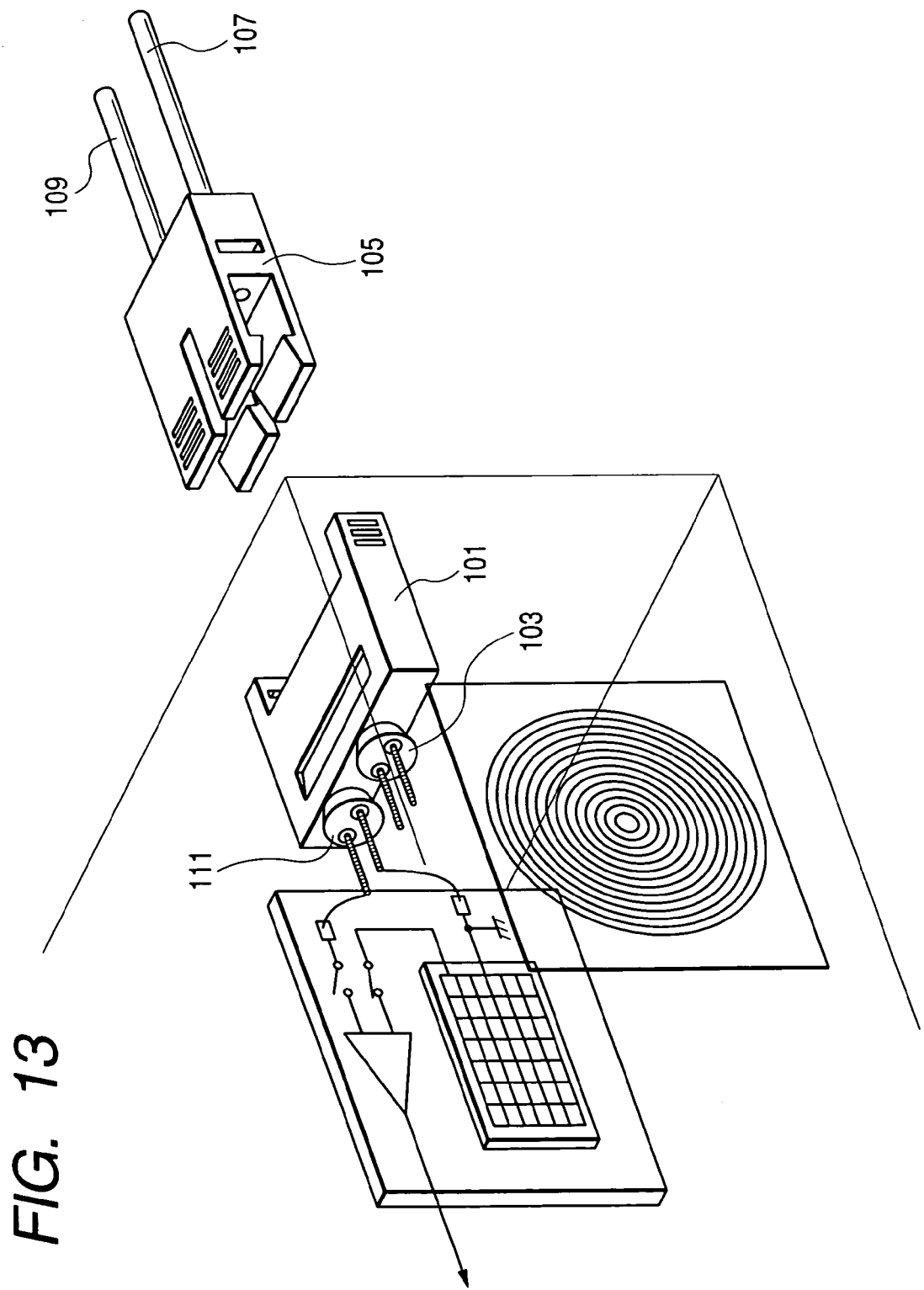
FIG. 13 is a perspective view which shows a major part of a laser radar according to the third embodiment of the invention.

FIG. 13 shows the laser radar 1 according to the third embodiment which is different from the first embodiment in that an additional laser diode 103 is used to monitor the lateral detectable zone instead of the laser diode 5.

The laser radar 1 of this embodiment has an internal connector unit 101 installed in the casing 2 and an external connector unit 105 leading to the lateral object detection optical unit 45 installed in the blinker of the system vehicle through optical fibers 107 and 109. The internal connector unit 101 has disposed therein a photodiode 111 and the laser diode 103 optically connected to the external connector 105. The laser diode 103 outputs a laser beam to the lateral object detection optical unit 45 through the optical fiber 107. The photodiode 111 receives through the optical fiber 109 a return of the laser beam from an object within the lateral detectable zone and converts it into an electrical signal which is used in determining the distance to the object present on the side of the system vehicle. The structure of this embodiment enables the lateral detectable zone to be monitored regardless of the scanning angle of the scanner mirror 11. An additional optical system(s) made up of the internal connector 101, the external connector 105, and the lateral object detection optical unit 45 may also be employed to increase the lateral detectable zone. In this case, one of the optical systems to be used may be selected as a function the speed and/or the direction of a path of travel of the system vehicle. For example, when the speed of the system vehicle increases, it usually becomes essential to determine the distance to a vehicle traveling ahead of the system vehicle. In this case, some of the optical systems serving to monitor the lateral detectable zone may be deactivated to decrease a load of operation of the controller 65 for increasing the cycle of measurement of the distance to the vehicle traveling within the front detectable zone.

Other arrangements and operation are the same as those in the first embodiment, and explanation thereof in detail will be omitted here.

FIG. 14(a) shows the laser radar 1 according to the fourth embodiment of the invention.

The laser radar 1 has an opaque casing 123 within which a main circuitry 121 is disposed and a pair of opaque connectors 125 and 127 installed in a side wall of the casing 123. The connectors 125 and 127 are coupled with external connectors 129 and 131, respectively.

Optical fibers 133 and 135 extend through the connectors 125 and 127 into the casing 123. Optical fibers 137 and 139 are joined to the external connectors 129 and 131, respectively.

In operation, a laser beam emitted by the laser diode 5 (not shown in FIG. 14(a)) is transmitted to the lateral object detection optical unit 45 or 63 (not shown in FIG. 14(a)) through the optical fibers 133 and 137. A return of the laser beam from an object is received by the photodiode 37 (not shown in FIG. 14(a)) through the optical fibers 139 and 135.

Other arrangements and operation are the same as those in the first embodiment, and explanation thereof in detail will be omitted here.

FIG. 14(b) shows the laser radar 1 according to the fifth embodiment of the invention.

The laser radar 1 has a casing 143 within which a main circuitry 141 is disposed and a pair of opaque connectors 145 and 147 installed in a transparent side wall of the casing 143. The connectors 145 and 147 have formed therein through holes 149 and 151 into which optical fibers 153 and 155 are inserted.

In operation, a laser beam emitted by the laser diode 5 (not shown in FIG. 14(b)) passes through the transparent side wall of the casing 143 and is transmitted to the lateral object detection optical unit 45 or 63 (not shown in FIG. 14(b)) through the optical fiber 153. A return of the laser beam from an object is transmitted through the optical fiber 155, passes through the transparent side wall of the casing 143, and reaches the photodiode 37 (not shown in FIG. 14(b)).

The casing 143 has no hole and may thus be kept airtight highly in order to avoid the ingress of dirt and dust into the casing 143.

Other arrangements and operation are the same as those in the first embodiment, and explanation thereof in detail will be omitted here.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments witch can be embodied without departing from the principle of the invention as set forth in the appended claims. For instance, the laser radar 1 may be designed to detect only the presence of objects within the front and lateral detectable zones in response to incidence of light on a photodiode or to detect only the presence of an object within the front detectable zone while measuring the distance to an object within the lateral detectable zone, and vice versa. The laser radar 1 may also be designed to monitor the front detectable zone using the same optical system as that monitoring the lateral detectable zone instead of the structure emitting a laser beam through the projection window 13.

What is claimed is:

1. An optical object detection apparatus for a vehicle comprising:
   an apparatus body installed in the vehicle, said apparatus body having disposed therein an optical device working to produce a light wave and process a return of the light wave from an object present around the vehicle to produce a signal indicative thereof;

an optical mechanism installed within said apparatus body, said optical mechanism working to direct the light wave to a first object detectable zone defined ahead of the vehicle;

a first optical unit installed in the vehicle in optical connection with said apparatus body, said first optical unit working to direct the light wave transmitted from said apparatus body to a second object detectable zone defined round the vehicle other than the first object detectable zone and to transmit a return of the light wave from an object present within the second object detectable zone to the optical device in said apparatus body; and second optical unit installed in the vehicle in optical connection with said apparatus body, said second optical unit working to direct the light wave produced in said apparatus body to a third object detectable zone defined around the vehicle other than the first and second object detectable zones and to transmit a return of the light wave from an object within the third object detectable zone to the optical device in said apparatus body, and wherein the number of the optical units operable is decreased as a speed of the vehicle increases.

2. An optical object detection apparatus as set forth in claim 1, wherein said optical device installed in said apparatus body processes the return of the light wave from the first object detectable zone in a given first operation time to produce the signal indicative of detection of the object and also process the return of the light wave from the second object detectable zone in a given second operation time following the first operation time to produce the signal indicative of detection of the object.

3. An optical object detection apparatus as set forth in claim 1, wherein said optical device includes a light wave emitting circuit emitting the light wave, a light wave sensitive circuit sensitive to the return of the light wave to produce the signal, and a light wave processing circuit which process the signal from the light wave sensitive circuit to detect the object, and wherein at least one of said first optical unit and said second optical unit includes a light emitting optical system and a light receiving optical system which are connected to the light wave emitting circuit, the light wave sensitive circuit and the light wave processing circuit.

4. An optical object detection apparatus as set forth in claim 1, wherein at least one of said first optical unit and said second optical unit is coupled with the optical device of said apparatus body through an optical connector unit, and wherein the optical connector unit includes a portion of a casing of said optical body.

5. An optical object detection apparatus as set forth in claim 1, wherein at least one of said first optical unit and said second optical unit is coupled with the optical device of said apparatus body through an optical connector unit, and wherein the optical connector unit includes an optical member extending through a casing of said apparatus body.

6. An optical object detection apparatus as set forth in claim 1, wherein said apparatus body includes a casing which has a light wave transmissible wall, wherein at least one of said first optical unit and said second optical unit is coupled with the optical device of said apparatus body through an optical connector unit, and wherein the optical connector unit includes an optical member joined to the light wave transmissible wall.

7. An optical object detection apparatus as set forth in claim 1, wherein at least one of said first optical unit and said second optical unit is installed in one of a blinker, a reflector, a tail lamp, and a sideview mirror.

8. An optical object detection apparatus as set forth in claim 2, wherein said optical mechanism works as a scanner to sweep the light wave across a given scanning angle, when said optical mechanism is sweeping the light wave in a first angular range defined across a central portion of the scanning angle, the light wave being directed to the first object detectable zone, when said optical mechanism is sweeping the light wave in a second angular range defined outside to first angular range within the scanning angle, the light wave being directed to second object detectable zone.

9. An optical object detection apparatus us set forth in claim 2, wherein the second operation time in which the optical device processes the return of the light wave from the second object detectable zone is decreased as a speed of the vehicle increases.

10. An optical object detection apparatus as set forth in claim 8, wherein said optical mechanism includes a scanner mirror which swings over the given scanning angle, an angle of swing of the scanner mirror being controlled to switch between a first scan mode in which the light wave is directed to the first object detectable zone and a second scan mode in which the light wave is directed to the second object detectable zone.

11. An optical object detection apparatus as set forth in claim 10, wherein the angle of swing of the scanner mirror is controlled as a function of a speed of the vehicle.

12. An optical object detection apparatus for a vehicle comprising;

an apparatus body installed in the vehicle, said apparatus body having disposed therein an optical device working to produce a light wave and process a return of the light wave from an object present around the vehicle to produce a signal indicative thereof;

an optical mechanism installed within said apparatus body, said optical mechanism working to direct the light wave to a first object detectable zone defined ahead of the vehicle;

a first optical unit installed in the vehicle in optical connection with said apparatus body for directing the light wave transmitted from said apparatus body to a second object detectable zone defined around the vehicle other than the first object detectable zone and to transmit a return of the light wave from an object present within the second object detectable zone to the optical device in said apparatus body; and a second optical unit installed in the vehicle in optical connection with said apparatus body for directing the light wave produced in said apparatus body to a third object detectable zone defined around the vehicle other than the first and second object detectable zones and to transmit a return of the light wave from an object within the third object detectable zone to the optical device in said apparatus body, and wherein one or more of the optical device, the first optical unit and the second optical unit is deactivated as vehicle speed increases.

13. An optical object detection apparatus as set forth in claim 12, wherein said optical device installed in said apparatus body processes the return of the light wave from the first object detectable zone in a given first operation time to produce the signal indicative of detection of the object and also process the return of the light wave from the second object detectable zone in a given second operation time following the first operation time to produce the signal indicative of detection of the object.

14. An optical object detection apparatus as set forth in claim 12, wherein said optical device includes a light wave emitting circuit emitting the light wave, a light wave sensitive circuit sensitive to the return of the light wave to produce the signal, and a light wave processing circuit which process the signal from the light wave sensitive circuit to detect the object, and wherein said optical unit includes a light emitting optical system and a light receiving optical system which are connected to the light wave emitting circuit, the light wave sensitive circuit, and the light wave processing circuit.

15. An optical object detection apparatus as act forth in claim 12, wherein said optical unit is coupled with the optical device of said apparatus body through an optical connector unit, and wherein the optical connector unit includes a portion of a casing of said optical body.

16. An optical object detection apparatus as set forth in claim 12, wherein said optical unit is coupled with the optical device of said apparatus body through an optical connector unit, and wherein the optical connector unit includes an optical member extending through a casing of said apparatus body.

17. An optical object detection apparatus as set forth in claim 12, wherein said apparatus body includes a casing which has a light wave transmissible wall, wherein said optical unit is coupled with the optical device of said apparatus body through an optical connector unit, and wherein the optical connector unit includes an optical member joined to the light wave transmissible wall.

18. An optical abject detection apparatus as set forth in claim 12, wherein said optical unit is installed in one of a blinker, a reflector, a tail lamp, and a sideview mirror.

19. An optical object detection apparatus as set forth in claim 13, wherein said optical mechanism works as a scanner to sweep the light wave across a given scanning angle, when said optical mechanism is sweeping the light wave in a first angular range defined across a central portion of the scanning angle, the light wave being directed to the first object detectable zone, when said optical mechanism is sweeping the light wave in a second angular range defined outside the first angular range within the scanning angle, the light wave being directed to the second object detectable zone.

20. An optical abject detection apparatus as sot forth in claim 13, wherein the second operation time in which the optical device processes process the return of the light wave from the second object detectable zone is decreased as a speed of the vehicle increases.

21. An optical object detection apparatus as set forth in claim 19, wherein said optical mechanism includes a scanner mirror which swing over to given scanning angle, an angle of swing of the scanner mirror being controlled to switch between a first scan mode in which the light wave is directed to the first object detectable zone and a second scan mode in which the light wave is directed to the second object detectable zone.

22. An optical object detection apparatus as set forth in claim 21, wherein the angle of swing of the scanner mirror is controlled as a function of a speed of the vehicle.

23. An optical abject detection apparatus for a vehicle comprising:

an apparatus body installed in the vehicle, said apparatus body having disposed therein an optical device working to produce a light wave and process a return of the light wave from an object present around the vehicle to produce a signal indicative thereof;

an optical mechanism installed within said apparatus body, said optical mechanism working to direct the light wave to a first object detectable zone defined ahead of the vehicle;

a first optical unit installed in the vehicle in optical connection with said apparatus body, said first optical unit working to direct the light wave transmitted from said apparatus body to a second object detectable zone defined around the vehicle other than the first object detectable zone and to transmit a return of the light wave from an object present within the second object detectable zone to the optical device in said apparatus body; and second optical unit installed in the vehicle in optical connection with said apparatus body said second optical unit working to direct the light wave produced in said apparatus body to a third object detectable zone defined around the vehicle other than the first and second object detectable zones and to transmit a return of the light wave from an object within the third object detectable zone to the optical device in said apparatus body, wherein said optical mechanism includes a scanner mirror which swings over a given scanning angle with an angle of swing controlled as a function of vehicle speed, and wherein the number of the optical units operable is decreased as a speed of the vehicle increases.

24. An optical object detection apparatus as set forth in claim 23, wherein said optical device installed in said apparatus body processes the return of the light wave from the first object detectable zone in a given first operation time to produce the signal indicative of detection of the object and also process the return of the light wave from the second object detectable zone in a given second operation time following the first operation time to produce the signal indicative of detection of the object.

25. An optical object detection apparatus as set forth in claim 23, wherein said optical device includes a light wave emitting circuit emitting the light wave, a light wave sensitive circuit sensitive to the return of the light wave to produce the signal, and a light wave processing circuit which process the signal from the light wave sensitive circuit to detect the object, and wherein at least one of said first optical unit and said second includes a light emitting optical system and a light receiving optical system which are connected to the light wave emitting circuit, the light wave sensitive circuit, and the light wave processing circuit.

26. An optical object detection apparatus as set forth in claim 23, wherein at least one of said first optical unit and said second is coupled with the optical device of said apparatus body through an optical connector unit, and wherein the optical connector unit includes a portion of a casing of said optical body.

27. An optical object detection apparatus as set forth in claim 23, wherein at least one of said first optical unit and said second is coupled with the optical device of said apparatus body through an optical connector unit, and wherein the optical connector unit includes an optical member extending through a casing of said apparatus body.

28. An optical object detection apparatus as set forth in claim 23, wherein said apparatus body includes a casing which has a light wave transmissible wall, wherein at least one of said first optical unit and said second is coupled with the optical device of said apparatus body through an optical connector unit, and wherein the optical connector unit includes an optical member joined to the light wave transmissible wall.

29. An optical object detection apparatus as set forth in claim 23, wherein at least one of said first optical unit and said second is installed in one of a blinker, a reflector, a tail lamp, and a sideview mirror.

30. An optical abject detection apparatus as set forth in claim 24, wherein said optical mechanism works as a scanner to sweep the light wave across a given scanning angle, when said optical mechanism is sweeping the light wave in a first angular range defined across a central portion of the scanning angle, the light wave being directed to the first object detectable zone, when said optical mechanism is sweeping the light wave in a second angular range defined outside the flint angular range within the scanning angle, the light wave being directed to the second object detectable zone.

31. An optical object detection apparatus as set forth in claim 24, wherein the second operation time in which the optical device processes process the return of the light wave from the second object detectable zone is decreased as a speed of the vehicle increases.

32. An optical object detection apparatus as set forth in claim 30, wherein said optical mechanism includes a scanner mirror which swings over the given scanning angle, an angle of swing of the scanner mirror being controlled to switch between a first scan mode in which the light wave is directed to the first object detectable zone and a second scan mode in which the light wave is directed to the second object detectable zone.

* * * * *